United States Patent

Neisch

[15] 3,706,351
[45] Dec. 19, 1972

[54] DIFFERENTIAL CONTROL
[72] Inventor: James C. Neisch, Orchard Lake, Mich.
[73] Assignee: North American Rockwell Corporation, Pittsburgh, Pa.
[22] Filed: Jan. 25, 1971
[21] Appl. No.: 109,538

Related U.S. Application Data
[63] Continuation of Ser. No. 807,060, March 13, 1969, abandoned.

[52] U.S. Cl. ............... 180/75, 180/82 R, 303/21 EB, 180/105 E, 180/1 R
[51] Int. Cl. .............................................. B60k 23/04
[58] Field of Search..... 180/1, 75, 82, 77; 303/21 BB, 303/21 EB; 74/711

[56] References Cited

UNITED STATES PATENTS 3,288,232    11/1966    Shepherd .............................. 180/1

Primary Examiner—Kenneth H. Betts
Attorney—John R. Bronaugh, Floyd S. Levison, E. Dennis O'Connor and Richard A. Speer

[57] ABSTRACT

An electromechanical system for limiting the speed differential between a pair of vehicle axle shafts driven through the differential unit. The system effectively compares the axle shaft speeds and, upon detection of a predetermined speed difference, controls the brakes to thereby reduce or eliminate the speed differential. In one form the control function is exercised when the speed differential exceeds a predetermined fixed value. In another form the control function is exercised whenever the speed of the slower axle shaft is less than a predetermined percent of the speed of the faster axle shaft.

14 Claims, 6 Drawing Figures

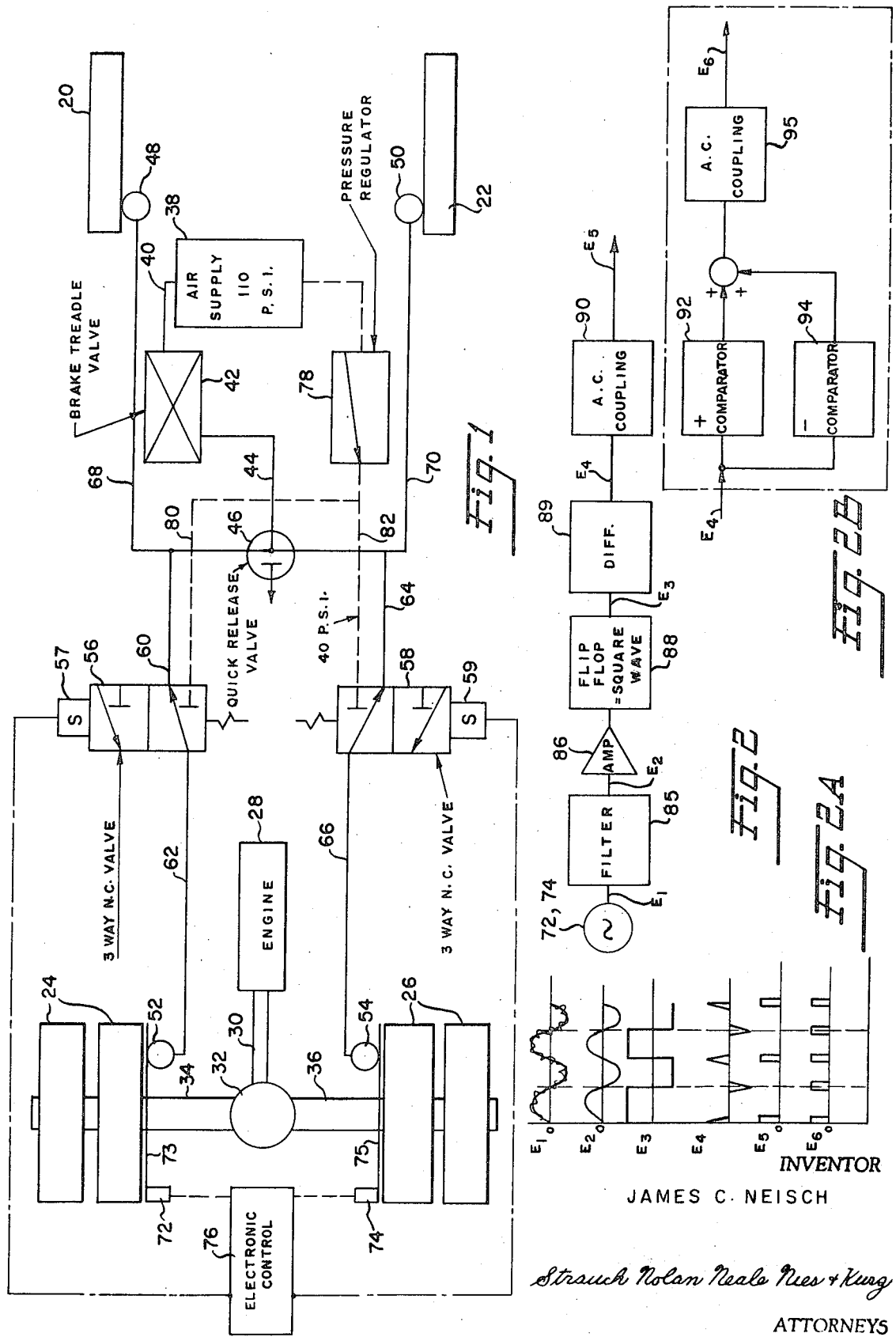

DIFFERENTIAL CONTROL

This application is a continuation of applicant's copending application Ser. No. 807,060 filed Mar. 13, 1969 for "Differential Control" and now abandoned.

BACKGROUND OF THE INVENTION

This invention relates to improved electromechanical systems for controlling the torque distribution between a pair of axles driven through an automotive differential unit.

As is well known, the conventional automotive differential mechanism is inherently effective to deliver torque to the axle driving the wheel having the least resistance to rotation. For example, when a driven wheel or set of wheels at one side of the vehicle passes onto a low traction surface, such as mud or ice, the differential transfers torque to these wheels, rapidly accelerating the wheels and depriving the opposite wheels of driving torque. As a result, the vehicle may become stuck or stalled despite the fact that one or more driving wheels are on a solid high friction surface. Also the rapid acceleration of one axle or set of wheels under these conditions imposes injurious stresses on the drive train particularly if the loss of traction is transient and the rapid acceleration is followed by rapid deceleration when the slipping wheels regain traction.

Many proposals have been advanced to solve this problem, generally by providing manual or automatic controls to convert the differential to a solid axle when the drive wheels encounter nonuniform traction. Manual controls for locking out the differential have proved to be completely unsatisfactory since they require constant and skilled driver attention. They do not provide sufficiently fast response to protect the drive train from damage and are susceptible to abuse since they may permit the differential to be locked out during normal operating conditions when differential action is essential.

It has also been proposed to incorporate clutch mechanisms within the differential which either constantly resist differentiating action or are automatically engaged when the torque distribution through the differential becomes unbalanced. While certain of these proposals provide reasonably satisfactory performance they inevitably increase the cost and complexity of the differential unit, are subject to wear and inevitably require additional attention and maintenance thus further increasing operational costs.

It has also been proposed to control torque distribution by means which are independent of the differential per se. For example, it has been proposed to brake a drive wheel which loses traction and overspeeds. According to one such proposal, disclosed in U. S. Pat. No. 3,169,595, electrical generators driven by the drive wheels produce signals which vary as a function of the rotational speed of the driven wheels. The signals are fed to signal mixing means for determining the difference between the signals and producing an output signal which varies as a function of the speed difference, the output signal being used to brake the faster wheel. While this proposal has certain advantages in that it eliminates the requirement for a specially designed differential, nevertheless if has offsetting disadvantages. The generators which are used to provide the basic signals are inherently incapable of providing their intended function at low vehicle speeds which are often encountered particularly in off-highway operations and at the same time providing reliable operation at normal road speeds. That is, if the generators are driven at sufficient speeds to provide reliable signals at low speed operation they will be dangerously overdriven at normal highway speeds. Further, it is presently understood that the system apparently lacks sufficient sensitivity to distinguish between improper differential action, which occurs when one wheel loses driving traction and the essential differentiating action required to permit the vehicle to negotiate turns. Accordingly, the system includes additional control apparatus for modifying the action of the basic control system as a function of the turning rate of the vehicle. This unnecessarily increases the cost and complexity of the system and decreases its reliability. Also this system apparently over-responds to a wheel overspeed condition in that when such a condition is detected full braking is applied to the spinning wheel which at least temporarily locks the spinning wheel which imposes dangerous shock loads on the drive train and inhibits forward movement of the vehicle.

SUMMARY OF THE INVENTION

In view of the foregoing it is the principal purpose and object of the present invention to provide improved electromechanical systems for controlling torque distribution between the output shafts of a conventional differential. The improved systems eliminate the above-stated disadvantages of prior systems, provide greater control sensitivity under widely varying operating conditions throughout the full range of vehicle speed, protect the drive train against damage, can be manufactured and sold at reduced cost, and provide an extended trouble-free service life.

In attaining these and other objects the invention provides means for generating electrical signals indicative of the rotational speeds of each of the drive wheels throughout the full range of the normal operational speeds of the vehicle. These signals are modified and shaped and are fed to a comparator which detects a difference between the signals indicative of an undesirable overwheel overspeed condition. When such a difference is detected the faster wheel is braked, the braking effort being sufficient to retard but not to lock the overspeeding wheel.

In one form of the invention the braking action is initiated when the difference between the speed of the faster and slower wheels exceeds a predetermined absolute value. Inasmuch as an overspeed condition at one wheel is matched by an equal underspeed condition at the opposite wheel the difference in wheel speed is actually twice the departure of either wheel from normal speed. Accordingly, the response and sensitivity of the control system based on total speed difference is quite good.

Alternately, the braking signal may be generated whenever the speed of the slower wheel is below a predetermined percent of the speed of the faster wheel. This latter system is preferred for many applications particularly for off-highway vehicles such as tractors, earth moving equipment and the like since it permits precise exercise of the control function at low speeds when both the normal wheel speed and the absolute difference in wheel speed due to wheel slipping may be small. At the same time the system is relatively insensitive at normal highway speeds when control of the differential is unnecessary and may be undesirable.

The electronic components of the system are commercially available and relatively inexpensive units which are extremely rugged, resistant to shock and mechanical damage, and relatively insensitive to temperature variations.

Additional objects and advantages become apparent as the description proceeds.

THE DRAWINGS

FIG. 1 is a diagrammatic illustration of a typical application of one embodiment of the invention;

FIG. 2 is a schematic illustration of that portion of the electrical control circuit which generates signals indicative of wheel speed and conditions those signals for delivery to the remainder of the circuit;

FIG. 2A is a chart showing the character of the signals generated by the several components of the circuit of FIG. 2;

FIG. 2B is a schematic illustration of a portion of the electrical control circuit constituting a modification of the circuit shown in FIG. 2.

DESCRIPTION OF PREFERRED EMBODIMENTS

Figure 3:
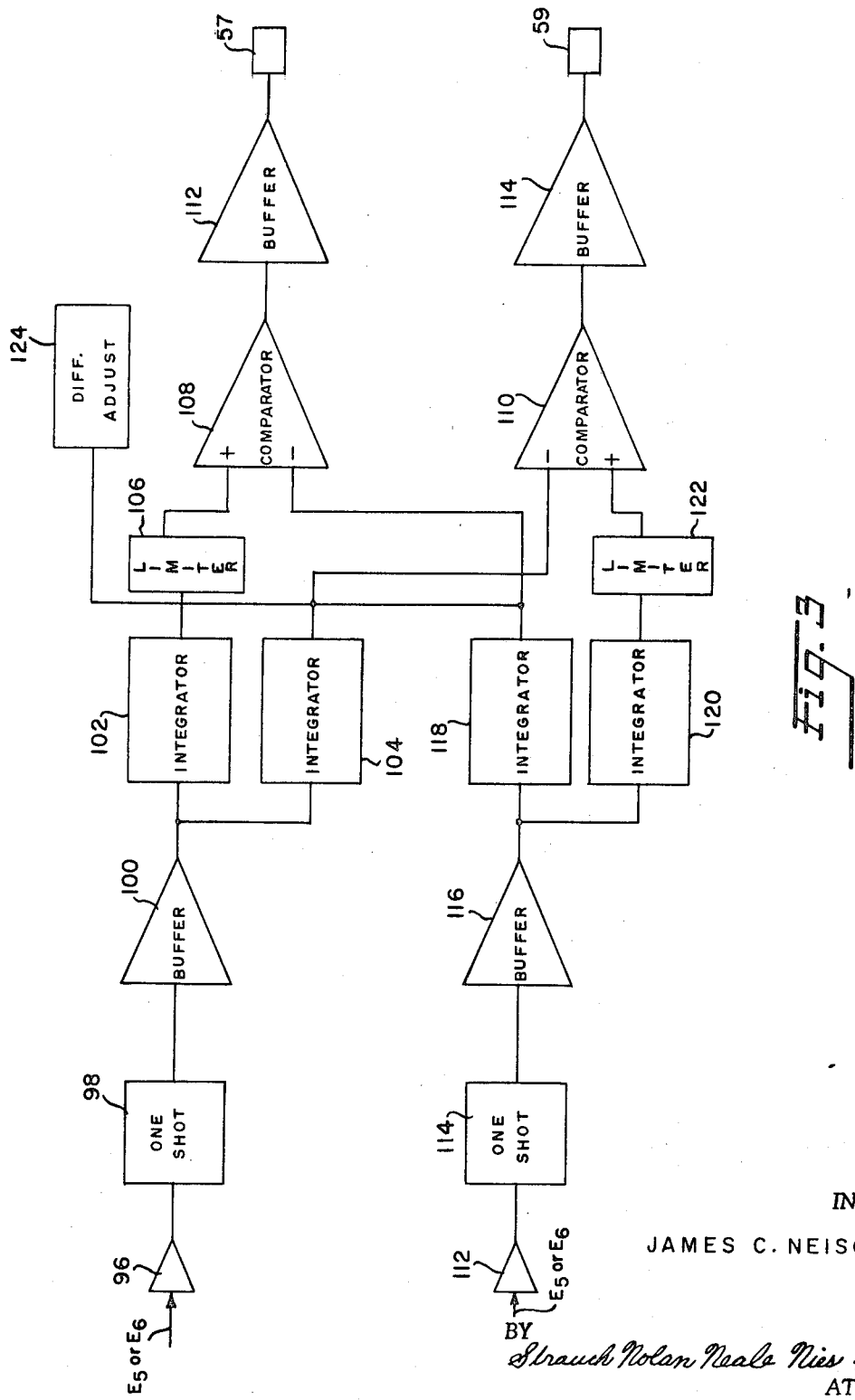
FIG. 3 is a block diagram of the portion of the circuit which converts the signals generated by the apparatus of FIG. 2 into braking signals.

In FIG. 1, to which detailed reference will now be made, illustrates schematically the application of the control system of the present invention to a vehicle having an essentially conventional air brake system. While the control system of the present invention may be applied readily to a variety of types of vehicles it is expected that it will have its greatest utility when applied to the control of heavyduty vehicles such as tractors and off-highway equipment.

In the illustrated embodiment the vehicle has a pair of front wheels 20 and 22 and a pair of rear wheel sets 24 and 26 the latter being driven by an engine 28 through a drive shaft 30, a conventional differential 32 and axles 34 and 36. Basically the conventional air brake system includes a reservoir or other source of pressure 38 connected by conduit 40 to the usual operator controlled treadle valve 42. The opposite side of the valve 42 is connected through a conduit 44 to the usual quick release valve 46.

Normally, the quick release valve is connected directly to the front vehicle brakes 48 and 50 and the rear vehicle brakes 52 and 54. In accordance with the present invention this circuit is modified by the inclusion of solenoid operated three-way valves 56 and 58 in the conduits 60 and 62 and 64 and 66 leading to the rear brakes. The quick release valve is connected through conduits 68 and 70 directly to the front brakes independently of the valves 56 and 58.

As explained in detail below the speeds of each of the rear wheels or wheel sets is constantly sensed by magnetic pickups 72 and 74 mounted opposite notched magnetic plates 73 and 75 carried by the vehicle brake drums not shown. In a typical case the plates have 360 peripheral notches. Accordingly, in each revolution of the wheel the pickups each generate 360 signals in the form of sine waves. The signals are fed to the electronic control system, indicated generally at 76, which is effective under predetermined conditions of wheel overspeed to energize the solenoid 57 of the valve 56 or the solenoid 59 of the valve 58 associated with the brake conduit leading to the overspeeding wheels or wheel sets.

When either of the valves are so actuated the associated rear wheel brake 52 or 54 is connected to the air supply 38 through a pressure regulator 78 and one of the conduits 80 or 82 to actuate the brake associated with the overspeeding wheel. Typically, the pressure regulator 78 is so set as to limit the actuating pressure delivered to the rear brake to 40 psi which is sufficient to retard the overspeeding wheel effectively but to avoid locking it to avoid the imposition of high shock loads on the drive train. Braking of the overspeeding wheel transfers torque to the opposite wheel and quickly eliminates the objectionable speed differential permitting the vehicle to move forward despite total or partial loss of traction at one side of the vehicle. When the speed differential is eliminated the previously actuated valve 56 or 58 is restored to its normal position and the brakes are released. If the previously overspeeding wheel is still on a low traction surface it will again tend to overspeed with the result that the valve 56 or 58 is actuated again to restore the braking action. In practice the very rapid system response may result in pulsing the brakes associated with the wheel having the tendency toward overspeed.

As stated above, the present invention provides two forms of control systems. In the first, the braking action is generated in response to the detection of a fixed speed differential and, in the second, the braking signal is generated in response to a condition in which the speed of the slower wheel falls below a predetermined percent of the speed of the faster wheel.

Each control system utilizes the input conditioner circuit diagrammatically illustrated in FIG. 2, the performance of the individual units being illustrated in the accompanying chart FIG. 2A.

The basic signal is generated by the magnetic pickups 72 or 74, which generate 360 signals of the character shown at E1, FIG. 2A, in each revolution of the associated wheel. The signal is fed through a filter 85 to eliminate static and other transients and is amplified by a buffer 86 and fed to a square wave generator 88. The resulting signal E3, FIG. 2A, is fed to a differentiator 89 and the modified signal E4 is fed to an AC coupling 90, the output of which is a short duration positive signal E5 generated 360 times in each revolution of the wheel. If desired, to increase the sensitivity of the system, the signal E4 may be alternately delivered to comparators 92 and 94 shown in FIG. 2B before passing to the AC coupling 95. The comparator 92 is arranged to generate a signal in response to the positive portions of the signal E4 and the comparator 94 is arranged to generate an identical signal in response to the negative portions of the signal E4 thus resulting in an output signal E6 identical with signal E5 but of double frequency. The same result can be achieved mechanically by doubling the number of notches on the brake drum.

The electronic system, to which the signal generated by the partial circuit of FIG. 2 is fed to generate braking action in response to a fixed differential between the speed of the left and right rear vehicle wheels, is illustrated in FIG. 3. The signal generated by the input conditioner (as illustrated in FIG. 2) associated with the pickup 72 is fed through an inverter 96 to a oneshot 98 which is, in effect, a pulse stretcher, then to a buffer-amplifier 100. The resulting signal is then split and fed to a pair of integrators 102 and 104 which effectively convert the incoming pulse delivered by the buffer 100 to an essentially steady state voltage signal, the absolute value of which is a linear function of the frequency of the pulses delivered by the unit 100. Thus the absolute value of the voltage output of the integrators 102 and 104 is a function of the speed of the wheel set 24. The signal emanating from the integrator 102 is fed through a limiter 106 to one terminal of a comparator 108. Similarly, the output signal of the integrator 104 is fed to one terminal of a like comparator 110. The signal delivered by the FIG. 2 conditioner associated with the pickup 74 is similarly fed successively through an inverter 112, a oneshot 114, a buffer 116, the signal then being split and fed to integrators 118 and 120. As in the case of the integrators 102 and 104 the output of the integrators 118 and 120 is an essentially steady state voltage signal having an absolute value which is a function of the speed of the associated wheel set 26.

The output of the integrator 118 is fed to the negative terminal of the comparator 108 while the output of the integrator 120 is fed through a voltage limiter 122 to the positive terminal of the comparator 110. A positive voltage signal of constant value is delivered by the unit 124 to the minus terminal of the comparator 108 and the minus terminal of the comparator 110. The comparators are so arranged that their output is normally low and changes to high when the voltage impressed on the plus terminal exceeds the voltage impressed on the minus terminal. When this occurs at the comparator 108 its output will change from low to high energizing the buffer-amplifier 112 to energize the solenoid 57 of valve 56 to apply the brakes at reduced pressure to the left wheel set 24. Similarly, when the output of the comparator 110 changes from low to high, buffer-amplifier 114 is energized to actuate the solenoid 59 associated with the valve 58 to apply the brakes associated with the right rear wheel set 26.

When the speed of the wheel set 24 equals the speed of the wheel set 26 the voltage output of all of the integrators will be equal. However, the output of integrators 104 and 118 is supplemented by the voltage delivered by the unit 124. Accordingly, the voltage impressed at the minus terminals of each of the comparators will be greater than the voltage impressed at the positive terminals. Thus the output of the comparators will remain low. If the speed of the left wheel set 24 increases with respect to the speed of the wheel set 26 the voltage at the plus terminal of the comparator 108 will increase while the voltage at the minus terminal decreases. Similarly, the voltage at the plus terminal of the comparator 110 will decrease while the voltage at the minus terminal increases.

However, the output of the comparator 108 will continue to remain low until the voltage generated by the integrator 102 exceeds the voltage generated by the integrator 118 by an amount equal to the voltage impressed on the system by the unit 124. By properly selecting this voltage, the system can be made insensitive to the normal differentiating action required to accommodate normal turning movement of the vehicle. Any further increase in the wheel speed difference however, changes the output of the comparator from low to high thus energizing the brake associated with the left wheel set 24 the brakes remaining energized until the speed differential is eliminated.

The output of the comparator 110 remains low during an overspeed condition of the left wheels since the voltage impressed at the minus terminal of the comparator continues to exceed the voltage impressed at the plus terminal. By corresponding action the brakes of the right wheel set will be energized when the speed of the right wheels exceeds the speed of the left wheels by an amount determined by the strength of the signal produced by the unit 124. When such an overspeed condition occurs, the output of the comparator 108 will remain low and the lefthand wheel brakes will remain de-energized.

Figure 4:
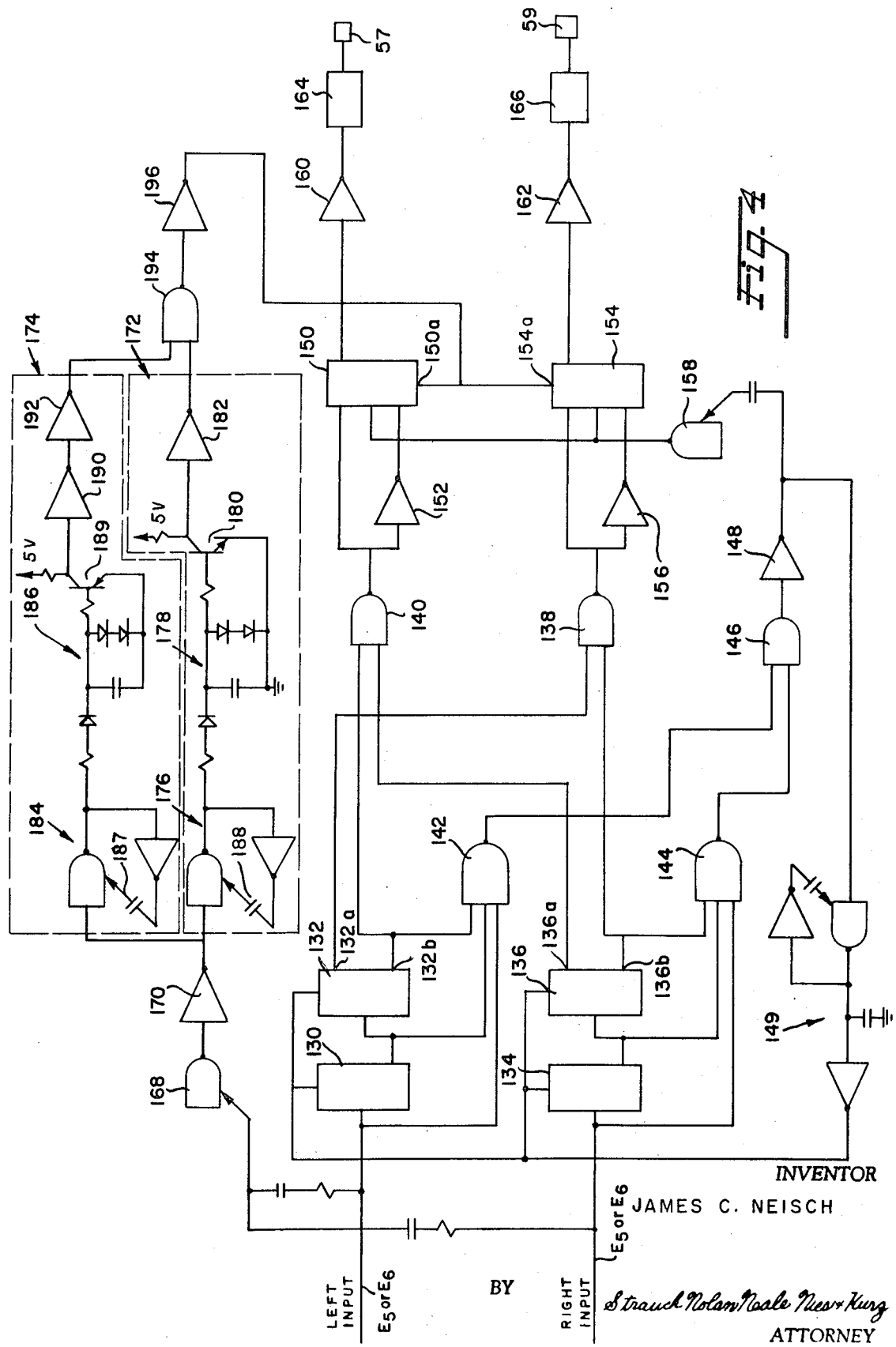
FIG. 4 is a diagram of a modified control circuit which produces a braking signal whenever the speed of the slower driven wheel is less than a predetermined percentage of the speed of the faster driven wheel.

The present invention also contemplates a control system in which a braking signal is generated to retard the faster wheel when the speed of the slower wheel is less than a predetermined percentage of the speed of the faster wheel. FIG. 4 discloses a control circuit for effecting this function, it being understood that this circuit and the associated brake control operates in response to signals generated by the input conditioner of FIG. 2, these signals being fed to the circuit of FIG. 4 at the points marked left input and right input. The conditioned pulse indicative of the speed of the left wheel set is fed to a counter register unit comprising of bistable flip-flops 130 and 132 which are so arranged that the state of the output terminals 132a and 132b follow the sequence 1, 1, 0, 0 and 0, 0, 1, 1, respectively.

The pulse input from the right wheel set is fed through an identical counter register unit comprising the bistable flip-flops 134 and 136, the state of the output terminals 136a and 136b of which changes in the same manner. The signals from the terminals 132a and 136b are fed to a gate 138, the output of which is high except when both input signals are high. Similarly, the terminals 132b and 136a are fed to the input of gate 140, the output of which is also high except when both input signals are high.

The counter register assemblies each generate a 4 ½ count output signal fed through respective gates 142 and 144 to an "or" gate 146, then through an inverter 148 to the reset circuit through a conventional time delay network indicated generally at 149. The output of the gate 140 is connected to an output register or memory unit comprising the JK flip-flop 150 and an inverter 152. The gate 138 is similarly connected to an identical output register or memory unit comprising the flip-flop 154 and the inverter 156. The output registers will accept and hold a signal until they are triggered by a strobe pulse fed from the reset circuit to a gate 158 then to the flip-flops 150 and 154. As explained below, the output of the output registers is high except when the speeds of the rear wheels or wheel sets is unequal. The output signals are fed through inverters 160 and 162 to conventional amplifiers 164 and 166 which, when energized, respectively actuate the solenoids 57 or 59 associated with the left and right rear wheel brake control valves 56 and 58.

Considering the system thus far described and assuming that the wheels are rotating at equal speeds, the logic output of the terminal 132b is 0, 0, 1, 1 while the logic output of the terminal 136a is 1, 1, 0, 0. Accordingly, the output of the gate 140 will not change. Similarly, the output of the terminal 132a is 1, 1, 0, 0 when the output of the terminal 136b is 0,0,1,1, and the output of the gate 138 will also remain unchanged. Accordingly, the output of the output registers will remain high and when the reset signal is generated together with the strobe or trigger pulse the high signals will be transferred to the respective inverters 160 and 162 the output of which is low thus maintaining the amplifiers and the associated brake valve solenoids de-energized thus producing no braking action. The reset signal restarts the cycle which is repeated indefinitely so long as the difference between the left and rear right wheel sets remains small.

Now let it be assumed that there is an increase in the speed of the left wheel set with a corresponding decrease in the speed of the right wheel set so that the speed of the right wheel set is 50 percent or less than the speed of the left wheel set.

Under these conditions the fourth count signal from the terminal 132b will reach the gate 140 at the same time as the second count signal from the terminal 136a. Since both signals are high the output of the gate 140 will then change and the output register will be conditioned to change its state upon delivery of the reset strobe signal at the completion of a 4 ½ pulse count. When this occurs the signal to the inverter 160 will change to low, its output will be high, amplifier 164 will be energized thus actuating the solenoid 57 and applying the reduced level braking action to the left wheel. This braking action will be maintained until the speed of the right wheel becomes greater than 50% of the speed of left wheel. When, as assumed, the left wheel is overspeeding there will be no change at the gate 138 since the output from the terminal 132a will be low when the reset strobe signal is delivered. Accordingly, there will be no braking action at the right side of the vehicle. The action of this system is completely symmetrical when the right wheel set overspeeds with respect to the left wheel set.

The control system of FIG. 4 also includes an override or inhibiting signal which renders the control system ineffective at vehicle speeds below a predetermined amount and at vehicle speeds above a predetermined amount. This is accomplished by supplying an inhibiting signal (logic 0) to terminals 150a and 154a, respectively, of the output registers 150 and 154.

To generate the inhibiting signal the conditioned input signals from the left and right rear wheel sets are coupled in the units 168 and 170 and the resulting signal is divided between a low speed responsive network indicated generally at 172 and a high speed responsive network indicated generally at 174. The network 172 comprises a oneshot pulse stretcher network 176 and an integrator network 178. The function of the two networks 176 and 178 is to convert the incoming pulses to a voltage signal, the value of which is a function of the frequency of the incoming pulses. When the vehicle speed is low the voltage signal produced by the integrator 178 is similarly low and is insufficient to trigger the transistor 180. Accordingly a 5 volt potential is maintained at the input of the inverter 182 maintaining the output of the inverter low. The high speed detector network includes a similar oneshot pulse stretcher 184 and integrator network 186. The oneshot network 184 is identical to the oneshot network 176 except for the value of the capacitor 187 included in the network which is much smaller than the capacitor 188 in network 176 with the result that pulses generated by the network 184 are substantially shorter than the pulses generated by the network 176. The voltage output of the integrator network 186 is fed to a transistor 189. Because of the relatively low voltage output of the integrator network 186, the transistor 189 will remain de-energized until the vehicle reaches a substantially higher speed than the speed necessary to trigger the transistor 180. Accordingly at low and intermediate speeds the input to inverter 190 will remain high, its output will remain low, and the output of the succeeding inverter 192 will remain high.

The output of the inverters 182 and 192 is fed to an "and" gate 194 the output of which will be high except when both inputs are high when it changes to low. The output of the "and" gate 194 is inverted by the inverter 196 and is fed to the terminals 150a and 154a of the output registers which operate as programmed except when the inhibiting signal is low.

Accordingly, when the vehicle is at rest the output from the inverter 192 will be high, the output from the inverter 182 will be low, the output of the gate 194 will be high, the output of the inverter 196 will be low and the action of the control system will be inhibited. The inhibiting signal will be maintained until the vehicle is moving at sufficient speed to trigger the transistor 180 at which time the inhibiting signal is removed. The actual vehicle speed at which this occurs can be determined by selection of the value of the various components of the networks 176 and 178. In a typical case the inhibiting signal will be maintained until the vehicle speed reaches .42 mph.

There will be no change in the system until the vehicle reaches sufficient speed to trigger the transistor 189 to change the input to the gate 194 from high to low thus re-establishing the inhibiting signal. Again the vehicle speed at which this occurs can be determined by proper selection of the values of the several components of the networks 184 and 186. In a typical case the control system will be inhibited at all vehicle speeds in excess of 20 mph.

It will be understood that the low speed inhibiting signal is generated when the vehicle is at rest or when the average speed of the rear vehicle wheels is equivalent to .42 mph. For example, if the vehicle is at rest and one rear wheel set is on a low traction surface, i.e., the vehicle is stuck in snow or mud, the vehicle speed may be zero but the speed of the slipping wheel may be sufficiently high so that the average speed of the rear wheels is greater than .42 mph at which time the inhibiting signal will be removed and the brakes will be applied to the slipping wheel. The low speed inhibiting signal is maintained to permit normal start up operation of the vehicle without the application of brakes to either vehicle wheel. Similarly, the high speed turnoff signal is provided to prevent application of the brakes when the vehicle reaches highway speeds. Under these conditions the differential control is not required and application of the brakes might result in loss of directional stability of the vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a vehicle having first and second wheels driven through a differential, said vehicle having a brake system including a brake associated with each wheel, a source of fluid under pressure and an operator controlled valve to selectively connect said source to said brakes, means for limiting the velocity differential between said first and second wheels comprising means for generating a control signal when the velocity differential between said first and second wheels exceeds a predetermined amount, a pressure regulator connected between said source and said brakes in parallel with said operator controlled valve, first and second valves interposed, respectively, between said pressure regulator and a corresponding one of said brakes, said first and second valves, when actuated, being effective to connect the brake associated with one of said wheels to said pressure source solely through said pressure regulator to thereby apply said brake with sufficient force to retard, but not lock, said one wheel, and means responsive to said signal to energize the one of said valves connected to the brake associated with said faster rotating wheel.

2. The combination according to claim 1 together with means for inhibiting said control signal when the average velocity of said first and second wheels is below a predetermined amount.

3. The combination according to claim 1 wherein said predetermined amount is fixed absolute velocity differential.

4. The combination according to claim 1 wherein said predetermined amount is a fixed percentage velocity differential.

5. In a vehicle having first and second wheels driven through a differential, said vehicle having brakes associated with each wheel, means for limiting the velocity differential between said first and second wheels comprising means for generating first and second pulse signals, the frequency of which is a function, respectively, of the speed of said first and second wheels, first bistable means for converting said first pulse signal to a pair of output signals of opposite logic value, second bistable means for converting said second pulse signal to a pair of output signals of opposite logic value, first gate means connected to receive one of each pair of output signals and adapted to provide an output signal only when the input signals are in predetermined phase relationship indicating that the velocity of said first wheel exceeds the velocity of said second wheel by a predetermined amount, second gate means connected to receive the other pair of said output signals and adapted to produce an output signal only when the input signals are in predetermined phase relationship indicating that the speed of said second wheel exceeds the speed of said first wheel by a predetermined amount, memory means storing the output of said gate means, and means responsive to delivery to one of said bistable means of a predetermined number of the one of said first or second pulse signals associated with the faster wheel to transfer the signal from said memory means to actuate the brake associated with said faster wheel.

6. The combination according to claim 5 together with means to inhibit the transfer of said signal from said memory means except when the average speed of said first and second wheels is above a predetermined minimum and below a predetermined maximum.

7. The combination defined in claim 5 wherein said predetermined amount is a fixed absolute velocity differential.

8. The combination defined in claim 5 wherein said predetermined amount is a fixed percentage velocity differential.

9. In a vehicle having first and second shafts driven through a differential, means for generating a control signal when the velocity of the slower shaft is less than a predetermined amount of the speed of the faster shaft comprising means for generating first and second pulse signals, the frequency of which is dependent, respectively, upon the speed of said first and second shafts, first means for converting said first pulse signal to a pair of distinct output signals, second means for converting said second pulse signal to a pair of distinct output signals, third means connected to receive one of each pair of output signals and adapted to provide an output signal only when the input signals are in predetermined relationship indicating that the velocity of said first shaft exceeds the velocity of said second shaft by a predetermined amount, fourth means connected to receive the other pair of said output signals and adapted to produce an output signal only when the input signals are in predetermined relationship indicating that the speed of said second shaft exceeds the speed of said first shaft by a predetermined amount, memory means storing the output of said third and fourth means, and fifth means responsive to delivery to one of said first and second means of a predetermined number of the one of said first or second pulse signals associated with the faster shaft to transfer the signal from said memory means and thereby generate said control signal.

10. The combination according to claim 9 together with means to inhibit the transfer of said signal from said memory means except when the average speed of said first and second shafts is above a predetermined minimum and below a predetermined maximum.

11. The combination according to claim 9 wherein said predetermined amount is a fixed absolute velocity differential.

12. The combination according to claim 9 wherein said predetermined amount is a fixed percentage velocity differential.

13. In a vehicle having first and second shafts driven through a differential, means for generating a control signal when the velocity of the slower shaft is less than a predetermined percentage of the speed of the faster shaft comprising means for generating first and second pulse signals, the frequency of which is dependent, respectively, upon the speed of said first and second shafts, first bistable means for converting said first pulse signal to a pair of output signals of opposite logic value, second bistable means for converting said second pulse signal to a pair of output signals of opposite logic value, first gate means connected to receive one of each pair of output signals and adapted to provide an output signal only when the input signals are in predetermined relationship indicating that the velocity of said first shaft exceeds the velocity of said second shaft by a predetermined amount, second gate means connected to receive the other pair of said output signals and adapted to produce an output signal only when the input signals are in predetermined relationship indicating that the speed of said second shaft exceeds the speed of said first shaft by a predetermined amount, memory means storing the output of said gate means, and means responsive to delivery to one of said bistable means of a predetermined number of the one of said first or second pulse signals associated with the faster shaft to transfer the signal from said memory means and thereby generate said control signal.

14. The combination according to claim 13 together with means to inhibit the transfer of said signal from said memory means except when the average speed of said first and second shafts is above a predetermined minimum and below a predetermined maximum.

* * * * *